United States Patent [19]

Forrester

[11] Patent Number: 5,040,920

[45] Date of Patent: Aug. 20, 1991

[54] DISPOSAL OF WASTE ASH

[75] Inventor: Keith E. Forrester, Stratham, N.H.

[73] Assignee: Wheelabrator Environmental Systems, Inc., Hampton, N.H.

[21] Appl. No.: 507,204

[22] Filed: Apr. 10, 1990

Related U.S. Application Data

[63] Continuation-in-part of Ser. No. 335,246, Apr. 10, 1989, abandoned.

[51] Int. Cl.$^5$ .................. B09B 1/00; C04B 18/06
[52] U.S. Cl. .................... 405/129; 106/705; 405/266
[58] Field of Search ............ 405/128, 129, 263, 266, 405/267, 271; 106/705, 709, DIG. 1

[56] References Cited

U.S. PATENT DOCUMENTS

| | | |
|---|---|---|
| 3,328,180 | 6/1967 | Bean . |
| 3,859,799 | 1/1975 | Jaco, Jr. . |
| 4,336,069 | 6/1982 | Dodson et al. . |
| 4,354,876 | 10/1982 | Webster . |
| 4,374,672 | 2/1983 | Funston et al. . |
| 4,615,809 | 10/1986 | King . |
| 4,629,509 | 12/1986 | O'Hara et al. . |
| 4,643,111 | 2/1987 | Jones ........................ 405/129 X |
| 4,726,710 | 2/1988 | Rosar et al. . |
| 4,731,120 | 3/1988 | Tuutti . |
| 4,741,776 | 5/1988 | Bye et al. ................... 405/129 X |
| 4,744,829 | 5/1988 | Eirich et al. . |
| 4,762,623 | 8/1988 | Kapland . |
| 4,804,147 | 2/1989 | Hooper . |

OTHER PUBLICATIONS

Goodwin, "Engineering and Design Aspects: Disposal and By-Product Utilization of FGD Residues", Proc. 10th EPA/EPRI Sympos on FGD, Atlanta, Ga., Nov. 1986.
Forrester, "Comparison of Municipal Solid Waste Leachate to MSW Ash Residue Leachate Using a Risk Algorithm", Oct. 1988.
Forrester, "State-of-the-Art In Thermal Recycling Facility Ash Residues Handling, Reuse, Landfill Design and Management", Jan. 1989.

*Primary Examiner*—David H. Corbin
*Attorney, Agent, or Firm*—Banner, Birch, McKie & Beckett

[57] ABSTRACT

Waste ash is controlled and adjusted in its water content to result in a compacted permeability of about $10^{-5}$ cm/s or less. With particle size distribution adjustments, the compacted permeability can be made even lower. The impermeable structure is useful as a cover or cap for existing landfills to prevent leaching as a liner in new sites. Processing the ash can result in a volumetric decrease of more than 40% thereby extending the useful life of new or existing landfills.

12 Claims, No Drawings

DISPOSAL OF WASTE ASH

This application is a continuation in part of U.S. application Ser. No. 335,246 filed on Apr. 10, 1989, now abandoned. The contents of that application are herein incorporated by reference.

FIELD OF THE INVENTION

The invention relates to environmentally safe disposal of waste ash which is managed to have a moisture content and particle size distribution sufficient to minimize permeability and approach maximum solids density upon compaction.

DESCRIPTION OF RELATED TECHNOLOGY

Leaching occurs in a landfill when water permeates a bed of ash through void spaces between particles that are not closely packed. Such a flow of liquid can solubilize a portion of the inorganic components (e.g., heavy metals) of the ash that are intended to be retained in the bed. Escape of such leachate from the confines of the bed is not desireable. Disposal of leached materials has involved a variety of environmental safety and economic issues.

The art has looked at the problems associated with leaching and has generally looked to chemical treatment systems. For example, many processes use chemical adjuvants which interact with the chemical composition of waste materials to bind the inorganics materials inside the bed. See, U.S. Pat. Nos. 4,354,876 (Portland cement, lime, calcium sulfate hemihydrate, water glass, and synthetic resins as cementitous additives for non-pozzolanic powders); 4,615,809 (calcium sulfate dehydrate); 4,629,509 (calcium sulfide); 4,726,710 (sodium sulfur oxide salt); and 4,804,147 (chemical immobilizing agent and volumetric stabilizing agents) which are herein incorporated by reference. The goal of each of these processes is to produce an immobilized ash that is resistant to solubilization of inorganic compounds.

Unfortunately, chemical adjuvants are expensive in commercial quantities, do not serve to reduce the volume of the compacted ash, and may not reduce the volume of leachate that must be collected and treated. In addition, chemical adjuvants do not result in a monolithic structure that controls the release of small particles by air contact or water scouring.

It would be desirable to have an impermeable form of waste ash that has a sufficiently low permeability to render the ash impermeable. Such ash could be used productively as material for road beds, efficient liners, covers, or capping materials for new or existing landfill sites.

SUMMARY OF THE INVENTION

It is an object of the invention to provide a process that efficiently uses the physical nature of waste ash to form impermeable structures.

It is another object of the invention to provide a process that can be used to manage waste ash either at the landfill site or at the point of production.

In accordance with these and other objects of the invention which will become apparent from the description below, the process according to the invention comprises:

adjusting the moisture content of waste ash to a value within the range of about 10 to about 60 wt % and achieving a permeability of $10^{-5}$ centimeter/second (cm/s) or less upon compaction; and compacting the ash.

The process of the invention can reduce the permeability of most forms of waste ash by adjusting the water content of the ash layer to form a hydrostatic head across the bed. This hydrostatic head resists permeation independent of chemical composition and reduces liquid flow through the bed after compacting. Accordingly, any inorganic materials solubilized from the ash remain in the bed.

It is also within the invention to adjust the particle size distribution of the ash to enhance the hydrostatic head and further reduce permeation. Sizing the ash increases the solids density and reduces the storage volume of the ash which can substantially extend the land available for new landfills. Whether sized or not, ash treated according to the invention is made to have a sufficiently low permeability that the ash can be used as a cover, liner, or cap layer material for new or existing landfills.

DETAILED DESCRIPTION

A variety of particulate pozzolanic and nonpozzolanic waste materials referred to herein under the broad label "ash" may be processed in accordance with the invention. Those materials include, inter alia, nonhazardous solid waste ash, municipal solid waste ash, residues from the burning of solid wastes, ash from burning coal or other solid residues, dry scrubber residues, kiln dust, gypsum, and particulate wastes contaminated with or naturally containing low level radioactivity. A particularly preferred material for treatment by the present invention is a combination of ash (fly ash and/or bottom ash) and calcium-containing dry scrubber residue from the incineration of nonhazardous solid wastes. Ferrous materials may be removed by magnetic separation from the ash as in U.S. Pat. No. 4,804,147. The description contained in this patent is herein incorporated by reference.

The invention relates to adjusting the water content and compaction of the ash to affect the void spaces, and, therefore, permeation through the compacted structure. Leaching is avoided by reducing or eliminating permeation through the bed. It is believed that a suitably controlled water content acts to fill the void spaces among particles when the ash is compacted. The hydrophobic nature of ash particles appears to induce repulsion forces which cause the water to act as a bridge between particle surfaces. Such interparticle bridging provides a barrier to the permeation of water through the void spaces.

The method used to determine permeability of the ash is quite simple and can be used to generate a curve illustrating the relationship. Briefly described, several ash samples having different moisture levels are compacted and placed under a static column of water. By measuring the drop in water level over time, the permeability of the sample can be measured as a rate of drop. This test is described in detail as the Corps of Engineers Manual Test No. 1110-2-1906 which is herein incorporated by reference. As used herein, permeability is always measured in terms of this test.

Practice of the present invention can produce an ash layer having a permeability of less than about $10^{-5}$ cm/s. Material having a permeability of $10^{-6}$ cm/s or less is considered "impermeable". Impermeable materials may be used as cover layers for existing waste which can act as interim protection against leaching and scavenging animals. Those materials having a permeability of about $10^{-7}$ cm/s or less are so highly impermeable that layers made from them may be used as boundary liners. Such boundary liners may be used for the outside perimeters of new landfills to prevent leachate from escaping the bed, as a covering between layers, or as a cap to finally seal off an existing landfill.

Generally, fly ash masses with relatively high surface areas will generally require more water to achieve advantageous permeability than combined ash which includes a mixture of fly ash and the larger bottom ash. For example, combined ash might use 10-25% water while a fly ash mass of equal weight might use 25-60% water for similar permeabilities. The relationship between the particle surface area and water content can be determined with routine tests.

As mentioned above, the hydrophobic nature of many ashes appears to encourage the formation of interparticle water bridging. Such interparticle water bridging can serve as a pathway for the formation of a pozzolanic or pozzolan-like matrix which further reduces the permeability of the ash layer. Such a matrix forms when the amounts of calcium, aluminum, and silica are stoichiometrically conductive. Lime, silica, alumina, and calcium sulfate react in the presence of water to form ettringites and tobermites having the following compositions:

Ettringite: $3CaO.Al_2O_3.3CaSO_4.28-32H_2O$

Tobermite: $CaO.SiO_2.nH_2O$

Ettringite and tobermite are concrete-like materials (pozzolans) that bind waste materials in a monolithic, calcium containing solid of high structural integrity. Calcium that is available for pozzolanic activity ("free calcium") can come from the ash alone or from added lime, Portland cement, and/or the residue from flue gas scrubbing operations (dry scrubber residue) where lime is reacted with acidic flue gases. A free calcium content as low as about 1 wt % is useful for inducing a pozzolanic matrix although lower amounts may be useful depending on the particular ash composition and particle size distribution.

The composition of a typical combination of municipal solid waste fly ash, bottom ash, and dry scrubber residue is listed in Table 1 compared to Portland cement. Ash without scrubber residue has a similar composition but with a far lower, e.g. an order of magnitude, total calcium content (free and unavailable).

TABLE 1

| Component | Cement (wt %) | Combined Ash (wt %) |
|---|---|---|
| silica | 18-24 | 24 |
| alumina | 4-8 | 6 |
| ferrous oxide | 1.5-4.5 | 3 |
| calcium oxide | 62-67 | 37 |

In addition to optimizing the moisture content for lowest permeation rate, the particle size distribution of ash from an incinerator or in an existing landfill site may be modified to produce a more uniform distribution and enhance formation of a hydrostatic head in the layer. Ash according to the invention are desirably screened and/or ground so that at least about 85 wt % or more of the particles have a size of about 10 mm (about ⅜") or less. Such a particle size at the upper end of the distribution reflects a preferred balance between surface area, packing and density concerns. The largest size may be varied in practice and may include limited amounts of very large materials buried in the mass of appropriately sized materials. Such limited amounts of oversized materials do not affect the basic compaction mechanisms at work in accordance with the invention. This sizing may be performed with a wide variety of equipment depending on ash friability.

Friable ash particulates may become broken down by quenching the ash as it leaves the incinerator ("shock cooling") or by passage through a rotating screen such as a trommel. Less friable ash may require rollers or other apparatus having more severe conditions. In some instances, sizing may not be needed at all if the ash is sufficiently uniform in size to be compacted to a low permeability with an appropriate amount of added or removed moisture.

The uniformity coefficient is a convenient scale for describing particle size uniformity. The waste materials of the present invention can be described with the same uniformity test and definition as that for soils. An explanation of the uniformity coefficient is presented in *Soil Mechanics*, Robert R. Krieger Publishing Co., p. 59 (1984). Briefly stated, the uniformity coefficient measures the particle size distribution according to its weight distribution. The particle diameter at 10 wt % of the total and at 60 wt % are determined and formed into the following ratio:

$U = $ (diameter at 60 wt %)/(diameter at 10 wt %)

If U is less than 5, the material is said to have a "very uniform" distribution. If U is between 5 and 15 inclusive, the material has a "medium" uniformity. Over 15, the material is "very non-uniform".

As produced, waste ash is typically at a uniformity of about 40 or more. It is desirable for the invention to use ash with a uniformity of less than about 30, preferably less than about 20, more preferably less than about 10, and most desirably within a range from about 8 to about 10. There is some flexibility in the useful values of the uniformity coefficient due to the physical distribution, chemical composition, and existence of chemical adjuvants. Accordingly, the uniformity coefficient is useful but not necessary determinative.

A particle size distribution about that which is set forth in Table 2 is desirable in accordance with the invention. This sizing may occur at the site where the waste is produced, at the disposal site, or at some location intermediate these locations.

TABLE 2

| Particle Size (mm) | Preferred % Finer (wt) | % Finer (wt) |
|---|---|---|
| 0.6 | 6-18 | 9-12 |
| 2 | 25-37 | 28-33 |
| 6 | 62-67 | 63-66 |
| 10 | 85 or more | 88 or more |

If the ash is adjusted in size upon removal from the incinerator and before transport to the landfill site, water may be added to adjust the solids concentration of the ash to within about 75-85% (about 15-25 wt % water) for transport. This level of solids reduces dusting problems, thixotropic behavior, and premature pozzolanic reaction between the ash and calcium compounds.

Sizing the ash has a number of effects. First, the compaction density increases and achieves that increase with less water. In addition, the permeability is substantially reduced with a reduction in the best (i.e. lowest) permeability. Operating within about 75% of lowest permeability results in a compacted ash having good impermeability in addition to a high density. These effects can be explained by a more favorable particle size distribution for packing and interparticle water bridging.

An exemplary change in the particle size distribution is conveniently described with reference to a combined ash layer (bottom ash and fly ash) in an existing landfill. Passing the upper layer of combined ash through a trommel reduced the uniformity coefficient from about 35 to a sized combined ash having a uniformity coefficient of less than 10. The appropriate particle size distribution is presented in Table 3.

TABLE 3

| Particle Size (mm) | % Finer (untreated) | % Finer (treated) |
|---|---|---|
| 0.06 | 0 | 0 |
| 0.2 | 12 | 3 |
| 0.6 | 25 | 10 |
| 2 | 42 | 30 |
| 6 | 65 | 64 |
| 10 | 80 | 90 |

The moisture content was adjusted to about 19.0% which produced a compacted density of about 113 lb./cu. ft. (dry basis). Preferably, all ash according to the invention will be controlled to have a compaction density of about 100 lb/cu. ft. (dry basis) or more. More preferably, about 110 lb/cu. ft. or more. Before sizing and with an optimized moisture content according to the invention, the ash had a compacted density of about 75 lb./cu. ft. (dry). Even though 75 lb./cu. ft. is acceptable and within the invention, sizing the ash produced even better density and impermeability properties.

The effect of chemical adjuvants on the permeability of the compacted structure is illustrated in Table 4.

TABLE 4

| Ash | Additive | Permeability ($10^{-7}$ cm/s) |
|---|---|---|
| Raw BA | none | 180 |
|  | 6% cement | 1.5 |
|  | 9% cement | 0.17 |
| Raw CA | none | 55 |
|  | 3% lime | 8.1 |
|  | 6% lime | 42 |
| Sized CA | none | 190 |
|  | 6.6% cement | 0.20 |
|  | 6.6% lime | 0.23 |
|  | 10% cement | 0.113 |

The process according to the invention is particularly well suited to the formation of an impermeable cap over an existing landfill. Forming such an impermeable cap could include the steps of excavating ash from a top layer in said landfill; screening the excavated ash; placing the screened ash back into said landfill; optionally adding Portland cement to the screened ash; adjusting the moisture content of the screened ash; and compacting the ash with appropriate compaction means to form the impermeable cap.

Water may be added to the top layer by any suitable means. Tilling is particularly preferred for adding water if the top layer is not removed from the bed. If removed for size adjustments, water can be added at the exit from the sizing operation or by tilling into the uncompacted ash layer. Tilling affords the particular flexibility of allowing the addition of chemical adjuvants to create or induce a pozzolanic matrix or immobilize hazardous metals within the ash as in U.S. Pat. No. 4,629,509 which is herein incorporated by reference.

If water is to be removed, the ash layer can be removed to the desired depth and passed through suitable drying apparatus or tilled and left to evaporate naturally. A trommel through which hot air is passed concurrently to the ash flow is advantageous as particle size adjustments may be accomplished simultaneously with the drying.

Ash is desirably compacted with equipment that is sufficient to result in 75% or more of maximum dry compaction density as measured by ASTM D-1557. Dynamic compaction forces of 2 or more tons per square foot (T/sq. ft.) are useful to compact ash according to the invention. A particularly preferred compactor is a 20-40 ton smooth drum vibrating roller with a contact area of about 4 to about 6 sq. ft.

Suitable compaction, water content, and optionally optimized particle size distribution result in an ash layer having a permeability of less than about $10^{-5}$ cm/s, preferably about $10^{-6}$ cm/s, and even more preferably about $10^{-7}$ cm/s. The upper surface that is directly contacted by the compaction apparatus and for some depth lower are formed into an effective sealing surface which prevents the evaporation of any substantial amount of water from the structure. In addition, a cured pozzolanic matrix further restrains the bound water from escape. It is envisioned that ash having an adjusted water content according to the invention could be covered after compaction by some suitable, substantially water impermeable barrier until any pozzolanic matrix has cured, e.g. about 1-10 days or more depending on free calcium content, water content, particle size, and compaction force.

As stated above, waste ash according to the invention exhibits desirable properties for use in a number of applications where structural integrity and low permeability are desirable. Road beds are one such application. Low permeability reduces the occurrences of freeze/thaw stress and, therefore, results in roads having lower maintenance costs. In addition, landfill sites are particularly well served by the instant invention.

The reduction in waste ash volume realized by the present invention is significant in term of extending the available landfill areas now available. Typically, municipal solid waste ash landfills are estimated on the basis of a wet density of 74 lb/cu. ft. and a water concentration of about 15-25%. Using an average moisture content of 20%, the typical dry density for landfill size estimation becomes 59.2 lb/cu. ft. In terms of initial and final densities, the volumetric savings resulting from a higher density is calculated as:

$$\% \text{ volume saved} = 100 \left[ 1 - \frac{\text{(initial dry density)}}{\text{final dry density}} \right]$$

Therefore, the process of the invention results in an overall 48% volumetric savings compared to a typical municipal ash landfill. This volumetric savings can have profound effects on the rate at which landfill sites are filled.

48% vol. saving = 100[1−59.2/113.31]

I claim:

1. A process for reducing the permeability and increasing the density of compacted nonhazardous waste bottom ash having an adjustable water content, said process comprising:

sizing said waste bottom ash to a particle distribution consisting essentially of bottom ash particles with the following particle size distribution about 6–18% smaller than 0.6 mm;

about 25–37% smaller than 2 mm;

about 62–67% finer than 6 mm; and about 85% or more finer than 10 mm;

adjusting the water content of said ash to within a range of about 10 to about 25 wt % to achieve a permeability of about $10^{-5}$ cm/s or less upon compaction; and compacting said ash.

2. The process according to claim 1 further comprising:

adjusting the moisture content of said ash to achieve a permeability of about $10^{-6}$ cm/s or less upon compaction.

3. The process according to claim 2 further comprising:

adjusting the moisture content of said ash to achieve a permeability of about $10^{-7}$ cm/s or less upon compaction.

4. The process according to claim 3 further comprising:

sizing said waste ash to a particle uniformity coefficient of about 30 or less.

5. The process according to claim 3 further comprising:

sizing said waste ash and adjusting said moisture content to achieve a compaction density of about 100 lb./cu. ft. or more on a dry basis.

6. The process according to claim 1 further comprising producing said waste ash by incinerating municipal solid waste.

7. The process according to claim 1 wherein the sizing step comprises tumbling, screening, grinding, and combinations thereof.

8. The process according to claim 1 wherein the waste ash is located in an existing landfill and the process further comprises:

excavating ash from a top layer in said landfill;

screening the excavated ash;

placing the screened ash back into said landfill;

adding Portland cement to the screened ash; and adjusting the moisture content of the screened ash.

9. The process according to claim 8 wherein the adding and adjusting steps are performed simultaneously by tilling.

10. The process according to claim 8 wherein the screening step produces particles having a uniformity coefficient of about 30 or less.

11. The process according to claim 10 wherein the screening step produces particles having a uniformity coefficient of about 20 or less.

12. The process according to claim 11 wherein the screening step produces particles having a uniformity coefficient of about 8 to about 10.

* * * * *